United States Patent Office 3,210,224
Patented Oct. 5, 1965

3,210,224
PROCESS FOR PRODUCING DAMPING
ALLOY MEMBERS
Hollis Craig Argo, Drexel Hill, Pa., assignor to Westinghouse Electric Corporation, Pittsburgh, Pa., a corporation of Pennsylvania
Filed Apr. 19, 1963, Ser. No. 274,127
4 Claims. (Cl. 148—142)

This invention is directed to a process for producing ferrous base alloy members having a high damping capacity.

The problems associated with vibration and its reduction are becoming increasingly important as the demands made on modern machinery and materials increase. For example, in the fields of rotating and reciprocating machinery, the suppression of vibration is necessary for the prevention or drastic reduction of fatigue failure of machine elements stemming from vibration. Members which must be designed to resist fatigue failure could undoubtedly be made much lighter if vibration could be suppressed. Another benefit which would accrue from controlled vibration would be the reduction of noise which reaches objectionable levels in the larger apparatus.

In the past, in attempts to reduce the deleterious effects of vibration on members, there have been developed various mechanical devices for attachment to the members subject to vibration for vibration control. Satisfactory mechanical damping devices have not been developed for all applications, and at any rate, even in those cases where they are generally successful in reducing vibration, additional weight, bulk, and expense is involved in providing such damping devices.

A solution much more satisfactory than mechanical damping members is the provision of materials having inherent damping properties, and which have the other physical properties required by the member which is to be subjected to vibration. It is with this concept of providing high inherent damping properties in metals that this invention is concerned.

A critical problem which faces the designers of steam turbines is obtaining a material suitable for use in the manufacture of large, low temperature blades. The blades now being produced are as long as 25 inches, while the designs for future machines contemplate blades of almost twice that length. It is readily seen that blades of such extreme length present serious vibration problems.

Recent efforts to provide alloys having good inherent damping properties are embodied in U.S. Patent No. 2,829,048, issued April 1, 1958, to A. W. Cochardt et al., and in U.S. application Serial No. 721,275, filed March 13, 1958, now abandoned by A. W. Cochardt et al., both assigned to the assignee of the present invention. The alloys disclosed therein possess a combination of damping properties and good mechanical properties at elevated temperatures unequaled in the prior art.

On rare occasions, metallurgists had observed in photomicrographs small areas having a structure known as "cellular precipitate." This cellular precipitate structure had been regularly regarded as being undesirable and efforts had been made to suppress it. However, in U.S. application Serial No. 846,906, filed October 16, 1959, by John Bulina et al., assigned to the assignee of the present invention, novel heat-treated alloys and members containing substantial amounts of cellular precipitate were disclosed as having exceptionally good damping properties. The present invention constitutes an improvement of the invention disclosed in the above mentioned application.

The cellular precipitate comprises a plurality of lamellar colonies which consist of areas of relatively depleted matrix continuous with itself and the alloy matrix proper, and spaced strips of precipitate disposed in the depleted matrix. The spaced strips of precipitate in the depleted matrix resemble the pearlite structure in iron alloys. It is clearly observed in certain alloy sections etched with Frye's etch or electrolytically etched in a 10% chromic acid solution at a magnification of 500×.

In determining the relative damping characteristics of the alloy of this invention, the vibration tests described in the following publication were employed: "Foppl-Pertz Damping Machines," Metals and Alloys, New Products Section, February 1931, page 28.

The logarithmic decrement, as generally defined, was determined for the alloys at various vibratory surface shear strain values.

The object of this invention is to provide a process for heat treating a ferrous base alloy member to produce a controlled amount of lamellar colonies and thereby produce good damping characteristics and a relatively high strength level.

It is another object of this invention to provide a precipitation hardenable ferrous base alloy member having good damping properties and a relatively high strength level, the alloy member comprising predetermined critical amounts of iron, a proportion of nickel, a quantity of copper to produce precipitation hardening, small amounts of columbium to serve as a solid solution hardener, in which a controlled amount of lamellar colonies were a precipitate distributed in an essentially ferrous matrix. Other objects of the invention will, in part, be obvious and, in part, will appear hereinafter.

For a better understanding of the nature and objects of the invention, reference should be made to the following detailed description and drawings, in which.

Figure 1:
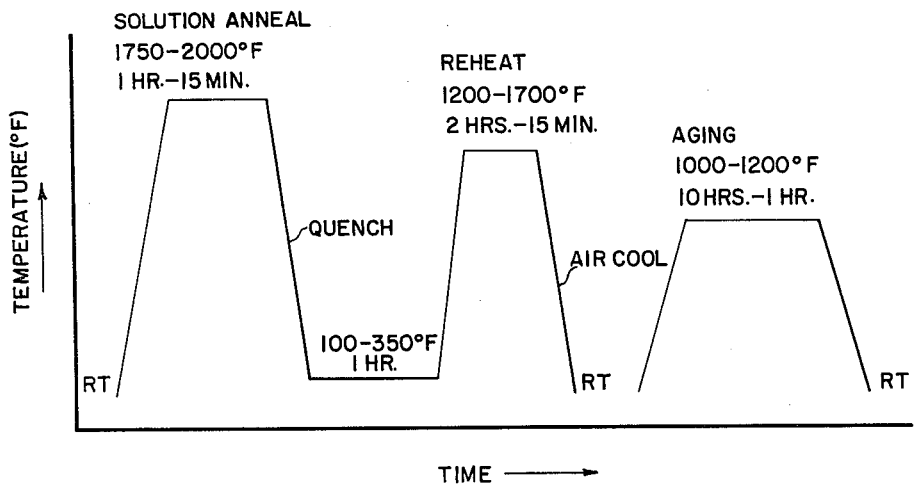
FIGURE 1 is a schematic showing of a heat treatment in accordance with this invention.

Broadly speaking, the alloys to which the heat treatment of this invention applies are precipitation hardenable ferrous-base alloys. More particularly, the suitable alloys are those consisting essentially of, from 10% to 20% chromium, from 3% to 5% nickel, up to 5% copper to produce precipitation hardening, up to 1.5% columbium as a solid solution hardener, up to 1.5% manganese, up to 1.5% silicon, up to 0.15% carbon and the balance iron with small amounts of incidental impurities.

The heat treatment of this invention consists essentially of solution treatment to assure that the member is entirely in the austenitic phase, controlled cooling from the annealing temperature to a temperature (interrupted quench temperature) in excess of room temperature to transform a portion of the autenitic to martensite, maintaining the alloy member at said lower temperature to transform the martensite to cellular precipitate, rapidly reheating the member to an elevated temperature which is lower than said solution annealing temperature, maintaining the member at said elevated temperature to obtain uniform temperature throughout the member, cooling the member to room temperature to transform the remaining austenitic to martensite, and aging the alloy member at an elevated temperature lower than said re-heat temperature to induce precipitation hardening of both the martensite and cellular precipitate to establish a higher strength level.

The alloy compositions set forth in the following Table I fall within the scope of the invention. These alloys were cast, forged and fabricated to bar-stock.

TABLE I

| Heat No. | C | Mn | P | S | Si | Cr | Ni | Cu | Cb | W* |
|---|---|---|---|---|---|---|---|---|---|---|
| 76285 | .028 | .38 | .020 | .015 | .54 | 16.62 | 4.35 | 3.50 | .26 | .01 |
| 92686 | .040 | .24 | .020 | .018 | .58 | 16.00 | 4.37 | 3.43 | .21 | .02 |
| 28027 | .041 | .25 | .019 | .012 | .58 | 16.07 | 4.28 | 3.54 | .28 | .02 |
| 61177 | .039 | .24 | .013 | .012 | .55 | 16.21 | 4.31 | 3.53 | .21 | .02 |
| 60340 | .041 | .27 | .029 | .010 | .54 | 15.98 | 4.23 | 3.40 | .24 | .06 |
| 60344 | .036 | .22 | .021 | .014 | .56 | 15.95 | 4.28 | 3.28 | .25 | .06 |
| 40053 | .044 | .25 | .017 | .010 | .49 | 16.48 | 4.20 | 3.17 | .20 | .03 |
| 60233 | .032 | .24 | .018 | .014 | .52 | 16.15 | 4.34 | 3.01 | .20 | .03 |
| 60280 | .040 | .25 | .019 | .014 | .50 | 16.19 | 4.23 | 3.10 | .25 | .08 |
| 57831 | .046 | .27 | .022 | .012 | .66 | 16.18 | 4.46 | 3.49 | .31 | .01 |
| 50068 | .045 | .26 | .018 | .011 | .56 | 15.58 | 4.34 | 3.40 | .23 | .02 |
| 60087 | .037 | .29 | .019 | .011 | .62 | 16.45 | 4.12 | 3.19 | .27 | .03 |
| 60245 | .038 | .21 | .018 | .015 | .53 | 15.95 | 4.13 | 3.11 | .22 | .02 |
| 19739 | .037 | .28 | .021 | .010 | .56 | 16.38 | 4.33 | 3.39 | .25 | .02 |
| 60730 | .041 | .32 | .019 | .015 | .55 | 16.38 | 4.34 | 3.48 | .25 | .02 |

* Residual.

A preferred range for the alloys of this invention is, by weight, from 15.5% to 17.5% chromium, from 3% to 5% nickel, from 3% to 5% copper, from 0.15% to 0.45% columbium, a maximum of 1% manganese, a maximum of 1% silicon, a maximum of 0.07% carbon, and the balance essentially iron.

The following example is illustrative of the practice of the present invention.

Example

An alloy identified in Table I as Heat No. 19739 was cast, forged, and fabricated to bar-stock.

The specimen bars are solution treated at 1900° F. for ½ hour and then quenched in boiling water. The bars remain in the boiling water for 1 hour to assure that they attain a uniform temperature. The bars are then removed from the boiling water and placed immediately in a furnace for rapid heating to 1550° F. at which temperature they remain for 15 minutes. After this 15 minute heat treatment the specimen bars are removed from the furnace and permitted to air-cool to room temperature. Thereafter the specimens are reheated to 1150° F. and are permitted to age at that temperature for 1 hour and then air-cool to room temperature.

The mechanical properties of the specimen bars treated as described above are as follows:

Ultimate strength _____ p.s.i__ 158,000
Yield strength _____ p.s.i__ 142,000
Elongation in 2 inches _____ percent__ 18.5
Reduction of area _____ do____ 58.6

Figure 2:
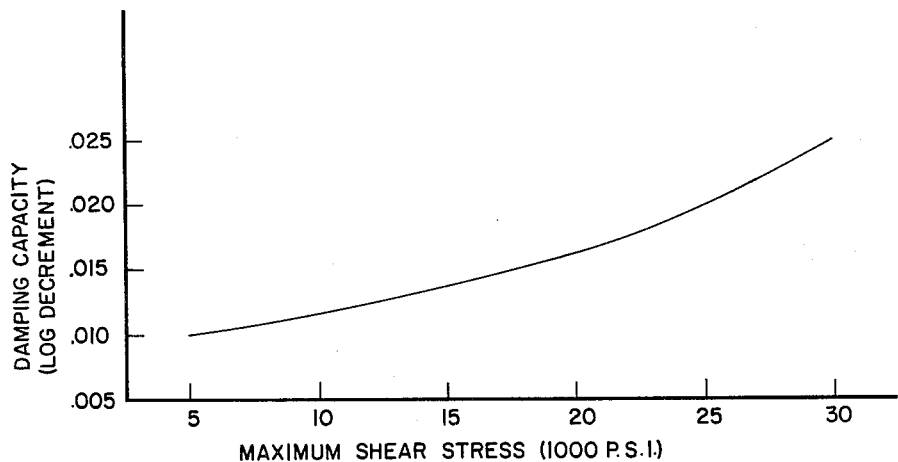
FIGURE 2 is a graph plotting damping in terms of logarithmic decrement against maximum surface shear strain at room temperature for the alloy member heat treated in accordance with this invention.

The damping capacity achieved by the method set forth above is illustrated in FIGURE 2.

Table II below summarizes heat treatments and results obtained thereby on certain other alloy heats of Table I.

TABLE II

| Heat No. | Heat Treatment (° F.) | | | | Mechanical Properties | | | | | | | | |
|---|---|---|---|---|---|---|---|---|---|---|---|---|---|
| | Solution | Quench | Reheat | Age | Y.S., p.s.i. | U.S., p.s.i. | Percent El. | Percent RA | BHN | Damping, 10 k.s.i. | −Log δ, 15 k.s.i. | At Shear, 20 k.s.i. | Stress, 30 k.s.i. |
| 61177 | 1,900 1 Hr | 212 1 Hr | 1,400 1 Hr | | 110,100 | 136,050 | 19.5 | 62.1 | 285 | | | | |
| 61177 | 1,900 1 Hr | 212 1 Hr | 1,400 1 Hr | 1,150 3 Hr | 112,350 | 155,000 | 14.4 | 60.8 | 326 | | | | |
| 61177 | 1,900 1 Hr | 70 1 Hr | 1,400 1 Hr | | 98,600 | 147,000 | 15.8 | 64.7 | | | | | |
| 61177 | 1,900 1 Hr | 122 1 Hr | 1,400 1 Hr | | 116,100 | 155,500 | 14.4 | 59.1 | | 0.0040 | 0.0057 | 0.0080 | 0.024 |
| 61177 | 1,900 1 Hr | 167 1 Hr | 1,400 1 Hr | | 124,000 | 159,900 | 13.6 | 58.9 | | | | | |
| 61177 | 1,900 1 Hr | 230 1 Hr | 1,400 1 Hr | | 111,350 | 180,000 | 10.1 | 37.9 | | | | | |
| 61177 | 1,900 1 Hr | 122 1 Hr | 1,400 1 Hr | 900 1 Hr | 136,000 | 153,500 | 16.6 | 59.8 | | | | | |
| 61177 | 1,900 1 Hr | 122 1 Hr | 1,500 1 Hr | | 114,600 | 154,250 | 14.2 | 61.1 | | | | | |
| 60245 | 1,900 ½ Hr | 212 1 Hr | 1,400 1 Hr | 1,150 3 Hr | 122,950 | 136,300 | 19.7 | 66.1 | | 0.0054 | 0.0061 | 0.0070 | 0.0088 |
| 50068 | 1,900 ½ Hr | 212 1 Hr | 1,400 1 Hr | 1,150 3 Hr | 126,700 | 140,950 | 20.6 | 64.4 | | 0.0054 | 0.0061 | 0.0070 | 0.0088 |
| 60087 | 1,900 ½ Hr | 212 1 Hr | 1,400 1 Hr | 1,150 3 Hr | 120,800 | 138,050 | 21.1 | 65.9 | | 0.0054 | 0.0061 | 0.0070 | 0.0088 |
| 19739 | 1,900 ½ Hr | 212 1 Hr | 1,400 1 Hr | 1,150 3 Hr | 118,550 | 137,550 | 20.9 | 65.4 | | 0.0057 | 0.0070 | 0.0075 | 0.0118 |
| 19739 | 1,900 1 Hr | 122 1 Hr | 1,550 ¼ Hr | 1,150 3 Hr | 141,550 | 147,000 | 19.0 | 65.5 | | 0.0040 | 0.0045 | 0.0048 | 0.0050 |
| 40053 | 1,900 1 Hr | 122 1 Hr | 1,550 ¼ Hr | 1,150 3 Hr | 140,800 | 146,300 | 19.7 | 65.3 | | 0.0040 | 0.0045 | 0.0042 | 0.0050 |
| 50068 | 1,900 1 Hr | 122 1 Hr | 1,550 ¼ Hr | 1,150 3 Hr | 142,000 | 147,800 | 19.2 | 64.6 | | 0.0040 | 0.0045 | 0.0048 | 0.0063 |
| 57831 | 1,900 1 Hr | 122 1 Hr | 1,550 ¼ Hr | 1,150 3 Hr | 141,350 | 145,350 | 19.2 | 66.2 | | 0.0040 | 0.0045 | 0.0048 | 0.0068 |
| 76285 | 1,900 1 Hr | 122 ½ Hr | 1,550 ½ Hr | 1,150 1 Hr | 136,000 | 141,750 | 19.4 | 65.5 | 321 | 0.0107 | 0.0121 | 0.0140 | 0.0210 |
| 76285 | 1,900 1 Hr | 122 ½ Hr | 1,550 ½ Hr | 1,150 2 Hr | 127,000 | 135,500 | 19.1 | 63.8 | 289 | 0.005 | 0.006 | 0.007 | 0.0105 |
| 76285 | 1,900 1 Hr | 122 ½ Hr | 1,550 ½ Hr | 1,150 4 Hr | 116,500 | 131,250 | 20.5 | 64.8 | 277 | 0.0063 | 0.0076 | 0.0088 | 0.013 |
| 76285 | 1,900 1 Hr | 122 ½ Hr | 1,550 ½ Hr | 1,150 6 Hr | 111,250 | 129,000 | 20.8 | 65.5 | 277 | 0.019 | 0.023 | 0.027 | 0.038 |
| 76285 | 1,900 1 Hr | 122 ½ Hr | 1,550 ½ Hr | 1,150 1+9 Hr | 105,500 | 129,250 | 23.0 | 67.8 | 293 | 0.0145 | 0.0175 | 0.023 | 0.038 |
| 76285 | 1,900 1 Hr | 170 1 Hr | 1,550 ½ Hr | 1,150 1 Hr | 141,000 | 145,600 | 18.1 | 62.4 | | 0.0034 | 0.004 | 0.0044 | 0.007 |
| 76285 | 1,900 1 Hr | 212 1 Hr | 1,550 ½ Hr | 1,150 1 Hr | 136,600 | 143,100 | 18.9 | 63.2 | | 0.0028 | 0.0027 | 0.0029 | 0.005 |
| 19739 | 1,900 ½ Hr | 250 1 Hr | 1,550 ¼ Hr | 1,150 1 Hr | 142,500 | 158,000 | 18.5 | 58.6 | 341 | 0.0040 | 0.0050 | 0.0066 | 0.0140 |
| | 1,900 ½ Hr | 250 1 Hr | 1,550 ¼ Hr | 1,150 1+9 Hr | 120,000 | 147,000 | 15.7 | 63.7 | | 0.0058 | 0.0066 | 0.0104 | [1] 0.025 |
| 61177 | 1,900 1 Hr | R.T. | 1,500 2 Hr | 1,150 4 Hr | 108,000 | 149,000 | 16.3 | 64.2 | | | | | |
| 61177 | 1,900 1 Hr | R.T. | 1,500 2 Hr | | 108,000 | 151,500 | 16.9 | 64.7 | | | | | |

[1] Approximate.

It should be particularly noted that the mechanical properties proved to be quite sensitive to the interrupted quench temperature (see Heat No. 61177 series in which only the quench temperature is varied). This phenomenon is surprising and unexpected because it would be supposed that the subsequent high temperature treatment would eradicate any structures produced at the lower temperatures. The phenomenon is usefully employed in this invention to control the mechanical properties of the alloys, although it is not as yet fully understood.

In practicing the process it will be understood that the time that the elements to be heat treated are maintained at a particular temperature will depend in large measure upon the dimensions of the elements undergoing the heat treatment. Thicker elements will, of course, require longer periods of time to attain uniform temperature. In the solution treatment, while the proper temperature range is stated to be from 1750° F. to 2000° F. and the time is stated to be 1 hour at the lower temperature to 15 minutes at the higher temperature, longer times will not be harmful. However, once a uniform austenitic structure has been achieved no additional benefit is conferred by prolonging the time at temperature. A solution treatment at 1900° F. for 1 hour has been found to be quite satisfactory in many instances.

The cooling rate from the solution treatment must be rapid to preserve the austenitic structure, and therefore, the cooling rate must be faster than that obtainable by cooling in still air. The solution treated element may therefore be quenched in oil, water, brine or salt bath, at a temperature of from 100° F. to 350°F. In some instances a forced draft air quench is satisfactory.

Again, at the interrupted quench temperature, the specific time held at the temperature is not critical, but must be sufficiently long to assure that the element undergoing treatment achieves uniform temperature throughout the cross-section thereof. The quench to this temperature, which is in the range of 100° F. to 350° F., has as its purpose the transformation of a portion of the austenite to martensite, and such transformation is temperature dependent rather than time dependent and the proportion which is transformed is therefore determined by the temperature of the quench.

The reheating in the furnace to a temperature of from about 1200° F. to about 1700° F. for about 15 minutes to 2 hours or more, has as its purpose the transformation of the alloy to cellular precipitate, which improves the damping capacity of the alloy. A preferred temperature range from reheating is from 1400° F. to 1550° F. with a holding time of ½ hour at the higher temperature to about 2 hours at the lower temperature. Again, for this transformation, the process appears to be temperature dependent rather than time dependent and the length of time will be primarily determined by the necessity for achieving uniform temperature throughout the specimen. The specimen after this reheating treatment is preferably water quenched but may be air-cooled to room temperature. Other quenching media, such as oil and brine may also be used.

The last step of the process is aging of the specimens to produce precipitation hardening to the desired degree, and this may be carried out at a temperature of from 1000° F. up to 1200° F. for a period of from about 10 hours to about 1 hour.

There has thus been described a heat treatment process for a ferrous base alloy which provides relatively good strength levels and high damping properties for alloys which are particularly adapted for use as a material for making exhaust blades for steam turbines. Such blades operate generally in the temperature range between 70° F. and 450° F. Turbine blades have been made in accordance with the process of this invention having lengths of 25 inches and 28 inches.

Although the present invention has been described with reference to preferred embodiments, it will be apparent to those skilled in the art that variations and modifications may be made without departing from the essential spirit and scope of the invention. It is intended to include all such variations and modifications.

I claim as my invention:

1. In the heat treatment of a machine element to provide a reasonably high strength level and good damping properties, the machine element composed of an alloy consisting essentially of, by weight, from 10% to 20% chromium, from 3% to 5% nickel, up to 5% copper as a precipitation hardening additive, up to 1.5% columbium as a solid solution hardener, up to 1.5% manganese, up to 1.5% silicon, up to 0.15% carbon, and the balance iron with small amounts of additives and incidental impurities, the steps of heating the machine element to a temperature in the austenitic region and maintaining the machine element at such temperature for a length of time sufficient to obtain substantially complete transformation of the machine element alloy to austenite, quenching the machine element rapidly in a medium at a temperature in the range from about 100° F. to 350° F. thereby transforming a substantial amount of austenite to martensite, maintaining the machine element temperature for a time sufficient to obtain a uniform temperature throughout the machine element, heating the machine element to a temperature in the range from about 1200° F. to about 1700° F. and maintaining the machine element at such temperature for a period of time of from up to 2 hours to about 15 minutes whereby a substantial amount of the alloy is transformed to lamellar colonies forming a cellular precipitate, cooling the machine element to room temperature to transform the remaining austenite to martensite, and thereafter aging the machine element at a temperature of from about 1000° F. to 1200° F. for a period of from 10 hours to 1 hour whereby the martensite is tempered and a satisfactory level of strength and damping capacity is achieved.

2. In the heat treatment of a turbine blade to produce relatively good strength levels and high intrinsic damping capacity, the turbine blade comprising an alloy composed essentially of, from 10% to 20% chromium, from 3% to 5% nickel, up to 5% copper to produce precipitation hardening, up to 1.5% columbium as a solid solution hardener, up to 1.5% manganese, up to 1.5% silicon, up to 0.15% carbon, and the balance iron with small amounts of additives and incidental impurities, the steps of heating the turbine blade to a temperature in the austenitic region and maintaining the blade at such temperature for a length of time sufficient to obtain substantially complete transformation of the blade alloy to austenite, quenching the turbine blade rapidly in boiling water to thereby transform a substantial amount of austenite to martensite, and maintaining the turbine blade at the temperature of boiling water for a time sufficient to obtain a uniform temperature throughout the turbine blade, heating the blade to a temperature of about 1550° F. for 15 minutes to transform a substantial amount of the martensite to lamellar colonies forming a cellular structure, air-cooling the turbine blade to room temperature to transform the remaining austenite to martensite, and thereafter aging the turbine blade at a temperature of about 1150° F. for a period of about 1 hour to temper the martensite and thereby produce satisfactory levels of strength and damping capacity.

3. In the heat treatment of a turbine blade to produce relatively high strength levels and high intrinsic damping capacity, the turbine blade comprising an alloy consisting essentially of, by weight, from 15.5% to 17.5% chromium, from 3% to 5% nickel, from 3% to 5% copper to produce precipitation hardening, from 0.15% to 0.45% columbium as a solid solution hardener, a maximum of 1% manganese, a maximum of 1% silicon, up to 0.07% carbon, and the balance iron with small amounts of incidental impurities, the steps of heating the turbine blade to a temperature of from 1750° F. to 2000° F. and maintaining the blade at such temperature for from 1 hour to 15 minutes to obtain substantially complete transformation of the blade alloy to austenite, quenching the turbine blade rapidly in boiling water to thereby transform a substantial amount of austenite to martensite, and maintaining the turbine blade at the temperature of boiling water for a time sufficient to obtain a uniform temperature throughout the turbine blade, heating the blade to a temperature of from 1400° F. to 1550° F. for from 2 hours to ½ hour to transform a substantial amount of the martensite to lamellar colonies forming a cellular structure, cooling the turbine blade to room temperature to transform the remaining austenite to martensite, and thereafter aging the turbine blade at a temperature of from about 1000° F. to 1200° F. for a period of from 10 hours to 1 hour to temper the martensite and thereby produce satisfactory levels of strength and damping capacity.

4. In the heat treatment of a turbine blade to produce relatively high strength levels and high intrinsic damping capacity, the turbine blade comprising an alloy composed of, by weight, from 15.5% to 17.5% chromium, from 3% to 5% nickel, from 3% to 5% copper to produce precipitation hardening, from 0.15% to 0.45% columbium as a solid solution hardener, a maximum of 1% manganese, a maximum of 1% silicon, up to 0.07% carbon, and the balance iron with small amounts of additives and incidental impurities, the steps of heating the turbine blade to a temperature of about 1900° F. and maintaining the blade at said temperature for about 1 hour to obtain substantially complete transformation of the blade alloy to austenite, quenching the turbine blade rapidly in boiling water to thereby transform a substantial amount of austenite to martensite, and maintaining the turbine blade at the temperature of boiling water for a time sufficient to obtain a uniform temperature throughout the turbine blade, heating the blade to a temperature of about 1550° F. for 15 minutes to transform a substantial amount of the martensite to lamellar colonies forming a cellular structure, air-cooling the turbine blade to room temperature to transform the remaining austenite to martensite, and thereafter aging the turbine blade at a temperature of about 1150° F. for a period of about 1 hour to temper the martensite and thereby produce satisfactory levels of strength and damping capacity.

References Cited by the Examiner

UNITED STATES PATENTS

| | | | |
|---|---|---|---|
| 2,482,098 | 9/49 | Clarke | 75—125 |
| 2,766,155 | 10/56 | Betteridge et al. | 148—142 |
| 2,766,156 | 10/56 | Betteridge et al. | 148—142 |
| 2,829,048 | 4/58 | Cochardt | 75—171 |

DAVID L. RECK, *Primary Examiner.*